2,795,951

TOOL CRACK DETECTION

Lyman W. Butler, Indianapolis, Ind., assignor to General Motors Corporation, Detroit, Mich., a corporation of Delaware No Drawing. Application November 30, 1953, Serial No. 395,263

7 Claims. (Cl. 73—104)

This invention relates to the detection of defects in hardened surfaces and more particularly to a method of exposing cracks and other defects in tools.

Carbide materials which possess an extreme hardness and are able to withstand the stresses generated in machining operations have long been used in forming cutting tools. However, the carbide material is difficult to work and carbide type tools are relatively expensive. It has been discovered that many failures of carbide or similar cutting tools in service are due, not to stresses encountered in machining operations but, to inherent defects present in the tool as manufactured which have been undetectable by prior tool inspection techniques. It is not only costly to replace tools which fail after a relatively short period of use but since many machining operations employ cutting tools in a multiple tool holder in order to produce a number of cuts on the work simultaneously, it is difficult to replace a defective tool and reposition it accurately without removing the entire tool assembly.

In the past there has been no satisfactory way to detect cracks and other inherent defects in carbide or other nonmagnetic cutting tools. Conventional magnetic type inspection processes, ultrasonic test methods and other known techniques of testing are ineffective. As a result, many cutting tools contain defects, heretofore undetectable, which cause their premature failure after they are placed in service.

I have now discovered that the aforementioned difficulties can be avoided and tool defects can be readily detected by the practice of the present invention which comprises subjecting the surface of a tool to a vapor blast carrying a mixture of finely divided abrasive and a liquid. Such a treatment serves not only to remove any surface film but to increase the contrast between tool defects and the surrounding tool surface. Moreover, the liquid acts as an indicator, being forced into the tool defects under pressure and subsequently seeping out, thereby facilitating crack detection by providing an increased area of marked contrast with respect to the surrounding matrix. If desired, the liquid employed may be a solvent capable of degreasing the tool surface. I have found that the method of the present invention provides a rapid, extremely efficient method of checking tools both for inherent defects and for detecting cracks and other defects in the tools after they have been in use.

Although the process is particularly well suited to the detection of defects in carbide tools, it will be understood, of course, that it may be used in testing other hardened surfaces such as nitrided or cyanided surfaces as well as surfaces of stainless steel and the like. Moreover, by the practice of the present invention, nonmagnetic surfaces of various types can be inspected for defects.

Generally, the length of time the vapor-liquid-abrasive stream should be applied depends upon the hardness of the material being tested. However, I have found that in most instances a period of from about 1 to 2 minutes is sufficient. Similarly, the pressure employed may be varied. However, I have found that excellent results are obtained by aspirating an abrasive-liquid slurry into a vapor stream having a pressure of at least about 40 p. s. i.

The abrasive employed is characterized by a very small particle size, and the term "mesh," as used herein in specifying particle size, means the number of screen openings per linear inch. A preferred abrasive has a particle size generally within the range of about 200 mesh to 1200 mesh. An abrasive having a particle size substantially in excess of about 200 mesh is ineffective especially if employed without being suspended in a liquid, tending to smear over defects without exposing them. At present I prefer to employ as an abrasive silicon dioxide having a particle size of about 325 mesh. It will be understood, of course, that other abrasives such as aluminum oxide, silicon carbide, quartz, spent catalyst, etc. having the desired particle size can be employed.

The liquid employed in the practice of the present invention facilitates detection of defects, the liquid being forced into the defects under relatively high pressure and subsequently, when the pressure is removed, seeping out and spreading over the blotter-like matte surface formed on the tool. While water is the preferred liquid at present, as indicated previously it is advantageous in certain applications to substitute for the water, either wholly or in part, a solvent capable of degreasing the tool surface so that degreasing and detection of tool defects are accomplished simultaneously. Moreover, a dyestuff or other coloring agent may be incorporated in the liquid, if desired, to further increase the contrast between the tool defect and the surrounding matrix. It will be understood, of course, that a suitable rust inhibitor can be incorporated into the liquid if necessary to prevent corrosion or rusting of parts which may be subjected to the vapor-abrasive-liquid spray.

While the ratio of abrasive to liquid can be varied in different applications, I have obtained superior results using a slurry consisting of about 1 volume of abrasive and 3 volumes of the liquid, preferably water. As used, the ratio of vapor to slurry may also be varied considerably depending upon the application. However, I have found that excellent results are obtained by aspirating the aforementioned slurry into air having a pressure of about 90 p. s. i. so as to deliver about 27 cu. ft. per minute. Since the method of the present invention greatly increases the contrast between a tool defect and its surrounding matrix, in most instances the defects can be seen with the naked eye. However, if desired, the treated surface may be inspected under low power magnification such as 30 × binoculars.

In examining a tool surface formed of tungsten carbide, molybdenum carbide or stainless steel, for example, I have found that superior results are obtained using the following sequence of steps: The surface is first degreased using a solvent such as trichloroethylene, xylene, toluene, benzene, carbon tetrachloride, or, in some instances, an aqueous detergent solution. The degreased surface is then subjected to a vapor blast consisting of a stream of an air-abrasive-liquid mixture formed by aspirating a slurrry consisting of a mixture of about 1 volume of silicon dioxide, having a particle size of about 325 mesh, and 3 volumes of water, the vapor stream being projected at a pressure of about 60 p. s. i. for a time sufficient to form a smooth matte surface on the part being inspected.

The thus treated surface is then rinsed with water or other liquid and is thereafter dried, preferably with clean compressed air. Tool cracks or other defects should then be visible either to the naked eye or under low power magnification. The matte surface formed by the abrasive blast serves as a blotter for the liquid forced into the defects, thereby adsorbing the liquid forced into the tool defects and increasing the contrast between the defect and the surrounding matrix.

The equipment employed in detecting tool cracks according to the present method forms no part of this invention and may take the form of various conventional spray machines, the only additional equipment necessary being a slurry container and means for aspirating the slurry into the vapor stream and projecting it in a finely divided form onto the surface to be examined.

It is to be understood that, although the invention has been described with specific reference to particular embodiments thereof, it is not to be so limited since changes and alterations therein may be made which are within the full intended scope of this invention as defined by the appended claims.

What is claimed is:

1. A method of detecting cracks in a carbide tool surface, said method comprising the successive steps of degreasing the carbide tool surface with a solvent, subjecting the degreased surface to a vapor stream consisting of an air-water-abrasive mixture in which the abrasive to water proportions are about 1 to 3 by volume, said abrasive consisting of finely divided silicon dioxide having a particle size of about 325 mesh, said vapor stream being under a pressure of at least 40 p. s. i. and being applied for a time sufficient to provide a matte finish on said tool surface, rinsing the thus treated surface, and drying said surface whereby cracks therein may be visually detected.

2. A method of exposing defects in a carbide surface, said method comprising subjecting a carbide surface for a period of one to two minutes to a stream of vapor containing a mixture of finely divided abrasive, a coloring agent, and a solvent capable of degreasing said surface, said stream being applied under pressure and for a time sufficient to provide a matte finish on said carbide surface, and thereafter rinsing and drying the treated surface whereby cracks in said surface may be visually detected due to the presence of said coloring agent in said cracks.

3. A method of exposing defects in a tool surface formed from a material selected from the group consisting of tungsten carbide and molybdenum carbide, said method comprising subjecting a surface formed from a material selected from the group consisting of tungsten carbide and molybdenum carbide to a mixture of a finely divided abrasive and a liquid, said mixture being carried in a stream of vapor at a pressure of at least 40 p. s. i. and being applied to said surface for a period of time sufficient to provide a matte finish on said tool surface whereby cracks in said surface may be visually detected.

4. A method of exposing defects in a tungsten carbide tool, said method comprising subjecting a surface of a tungsten carbide tool to a stream of vapor containing a mixture of finely divided abrasive having a particle size within the range from about 200 mesh to 1250 mesh and a solvent capable of degreasing said surface, said stream being applied to said surface under a pressure of at least 40 p. s. i. and for a period of time sufficient to provide a matte finish on said degreased surface, and thereafter rinsing and drying the surface so treated whereby cracks in said surface may be visually detected.

5. A method of exposing defects in a metallic carbide cutting tool, said method comprising subjecting a surface of a metallic carbide cutting tool to a stream of vapor containing a major proportion of a liquid vehicle and a minor proportion of a finely divided hard abrasive material, said stream being at a pressure of 60 to 90 p. s. i. and being applied to said surface for a sufficient period of time to provide a matte finish on said surface, and thereafter rinsing and drying said treated surface whereby cracks therein may be visually detected.

6. A method of detecting cracks in a carbide tool surface, said method comprising the steps of degreasing the carbide tool surface, subjecting the degreased surface to a vapor stream consisting of an air-water-abrasive mixture in which the proportion of water is appreciably greater than the proportion of abrasive, said abrasive consisting essentially of finely divided silicon dioxide having a particle size within the range of about 200 mesh to 1250 mesh, said vapor stream being under a pressure of at least 40 p. s. i. and being applied to said tool surface for a time sufficient to provide a matte finish on said surface, thereafter rinsing the treated surface, and drying said surface whereby cracks therein may be visually detected.

7. A method of simultaneously degreasing a carbide cutting tool and exposing any defects in a surface thereof, said method comprising subjecting a surface of said carbide cutting tool to a vapor-borne stream of an abrasive slurry under a pressure of at least 40 p. s. i., said slurry containing a mixture of finely divided silicon dioxide having a particle size of about 200 to 1250 mesh, a coloring agent and a solvent capable of degreasing said surface, said stream being applied to said surface for a period of one to two minutes to provide a matte finish on said degreased surface whereby cracks in said surface may be visually detected due to the presence of said coloring agent in said cracks.

References Cited in the file of this patent

UNITED STATES PATENTS

| 1,937,820 | Howard | Dec. 5, 1933 |
| 2,317,837 | Webster | Apr. 27, 1943 |
| 2,395,160 | Anderson | Feb. 19, 1946 |
| 2,420,646 | Bloom | May 20, 1947 |
| 2,548,264 | Howe | Apr. 10, 1951 |

OTHER REFERENCES

Pamphlet entitled "Liquid Honing," pub. by Vapor Blast Mfg. Co., Milwaukee, Wis., vol. 1, No. 1 (Nov. 1946), 8 pages. (A copy is in Div. 58.)